Aug. 18, 1970 W. R. SALVESEN 3,524,334
GAS ACTION LOCKING SYSTEM
Original Filed Nov. 16, 1967 8 Sheets-Sheet 1
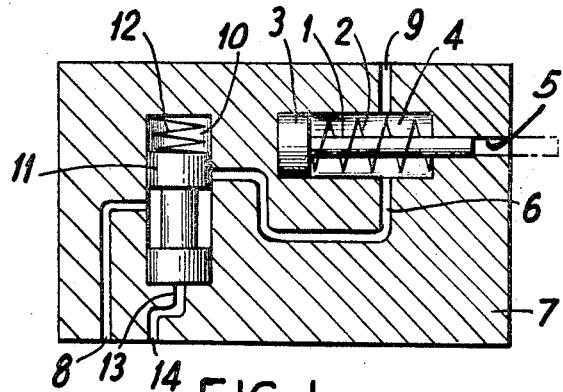
FIG. 1
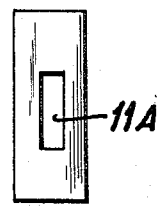
FIG. 7A
FIG. 2
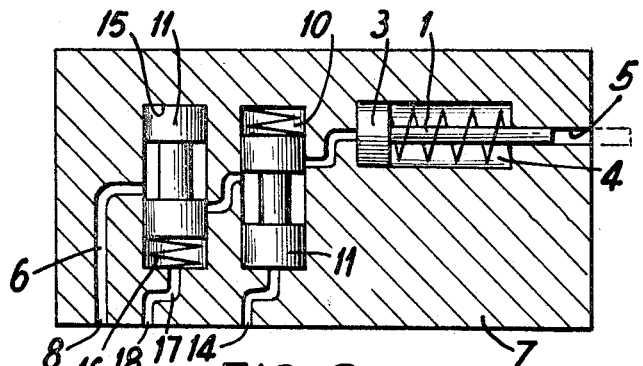
FIG. 7B
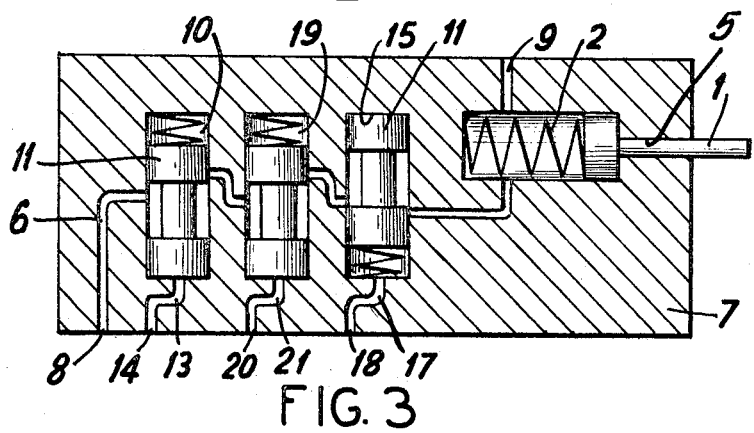
FIG. 3
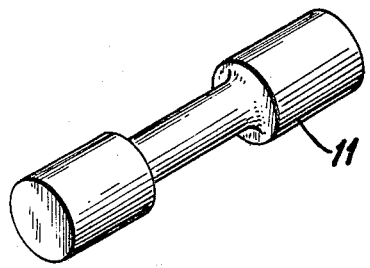
FIG. 7
INVENTOR.
WILLIAM R. SALVESEN
BY Auslander + Thomas
ATTORNEYS

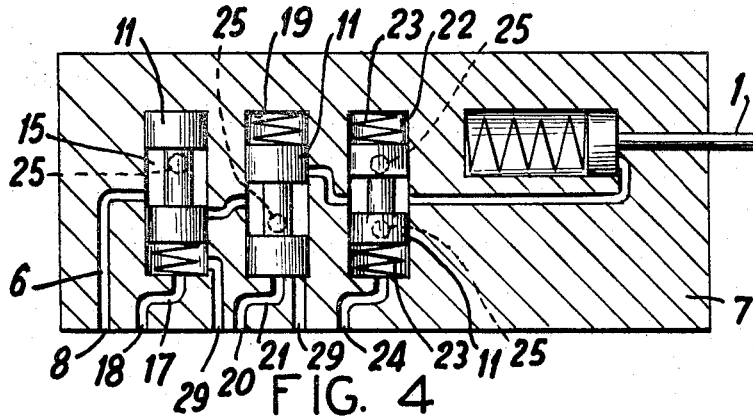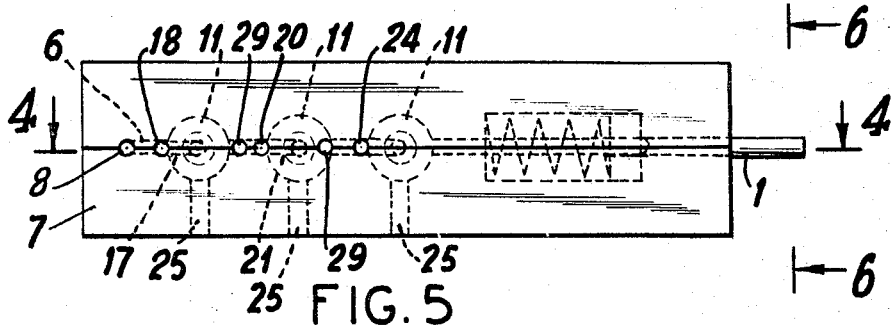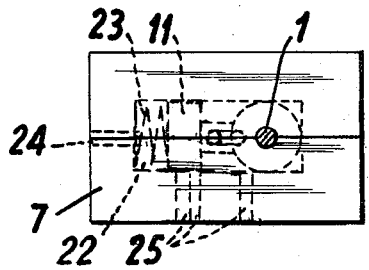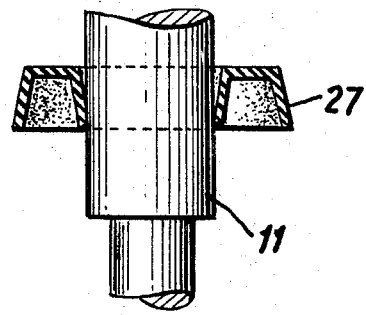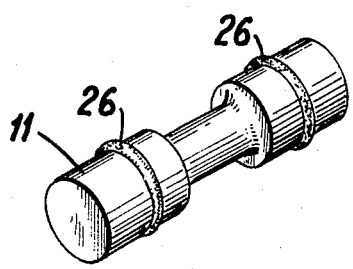

Aug. 18, 1970      W. R. SALVESEN      3,524,334
GAS ACTION LOCKING SYSTEM
Original Filed Nov. 16, 1967      8 Sheets-Sheet 4
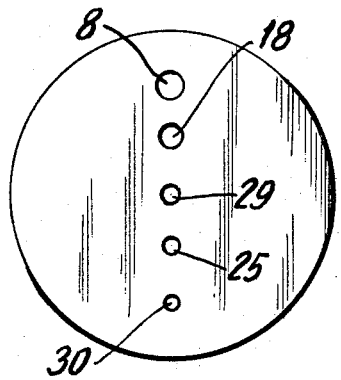
FIG. 13A
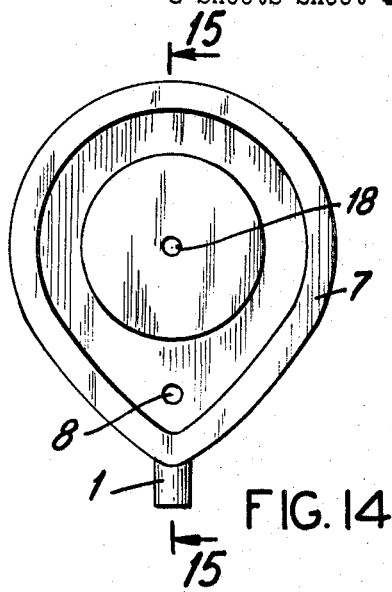
FIG. 14
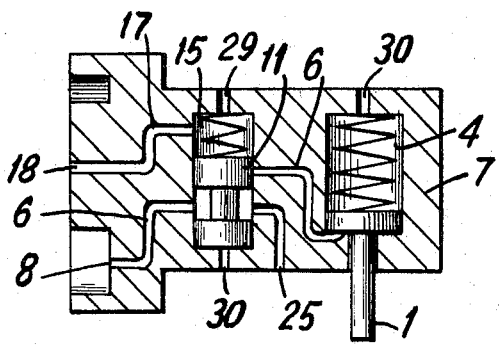
FIG. 15
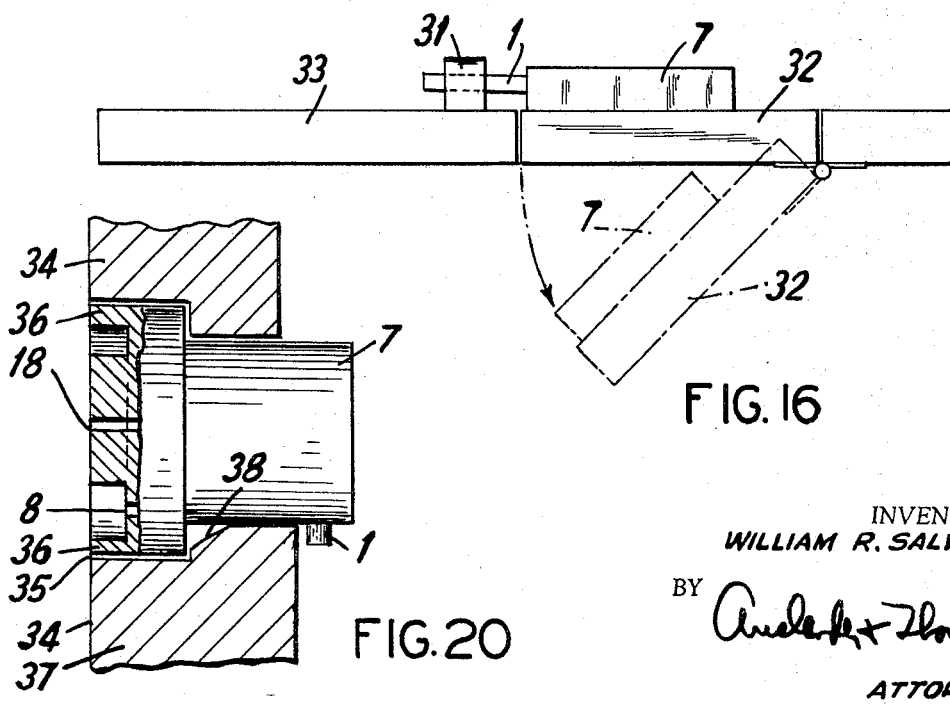
FIG. 16
FIG. 20
INVENTOR.
WILLIAM R. SALVESEN
BY
ATTORNEYS

INVENTOR.
WILLIAM R. SALVESEN
BY
ATTORNEYS

Aug. 18, 1970     W. R. SALVESEN     3,524,334
GAS ACTION LOCKING SYSTEM
Original Filed Nov. 16, 1967     8 Sheets-Sheet 7

INVENTOR.
WILLIAM R. SALVESEN
BY *Auslander + Thomas*
ATTORNEYS

United States Patent Office 3,524,334
Patented Aug. 18, 1970

3,524,334
GAS ACTION LOCKING SYSTEM

William R. Salvesen, Brooklyn, N.Y., assignor to Segal Products Co., Inc., Brooklyn, N.Y., a corporation of New York
Continuation of application Ser. No. 683,644, Nov. 16, 1967. This application Apr. 21, 1969, Ser. No. 818,196
Int. Cl. E05b 51/02
U.S. Cl. 70—275                                    27 Claims

ABSTRACT OF THE DISCLOSURE

A gas action locking system requiring the key combinations of gas action, either pressure, vacuum or both to actuate a plunger system to release a locking system. In order to effect a locking system of the present invention it is preferable to include the combination of at least two chambers and plungers therein, options as to the type of gas action to be applied and selection as to the proper openings to the routed paths to the at least two chambers for delivery of such gas action.

---

This is a continuation of application Ser. No. 683,644, filed Nov. 16, 1967 and now abandoned.

The present invention relates to a gas action lock controlled by a plunger system requiring proper selection of optional access means and gas forces to the plunger system to act as a key to release the locking system.

Various gas means have been employed in the past, either pressure or vacuum, to hold or release a plunger. In such instance the plunger usually served the function of a latch.

Gas actuatable plungers have served to hold lock type closures in apertures. They have even been used to control one or more plungers latching closed openings. Such means of the past once gas actuated have usually allowed opening of closures by removal, rotation or even the opening of hinged closures. In some instances gas action has served to hold mechanical locks such as on railroad car doors closed until gas pressure has been removed.

Devices of the past, even those designed to provide lock type security to coin boxes in parking meters have not provided much tamper-proof security. A typical device of the past required only simple application of vacuum to withdraw the latch plunger so that the closure body might be removed from its aperture giving access to the coin box.

According to the present invention a gas actuatable plunger system is provided in a locking system requiring the key combinations of gas action, either pressure, vacuum or both to actuate the plunger system to release a locking system.

The key to such locking system is the proper application of gas action to the correct gas paths, which actuate the plunger system its release to locking hold. The complexity of the key to such locking system may be raised by the permutations and combinations selected from the use of pressure, vacuum, the number of plungers, bypasses and counter locking positions of plungers and the presentation of openings for gas action not all of which function to release the locking system.

From outward appearances even the simplest devices of the present invention do not reveal what key is needed to release the locking system, thus inhibiting if not preventing tampering with the locking system.

Although such novel feature or features believed to be characteristic of the invention are pointed out in the claims, the invention and the manner in which it may be carried out may be further understood by reference in the description following and the accompanying drawings.

Figure 10:
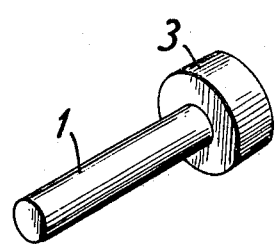
Figure 11:
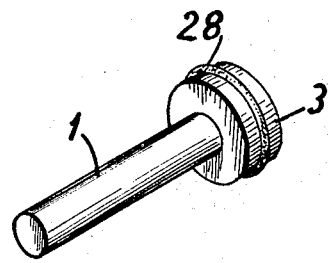
Figure 12:
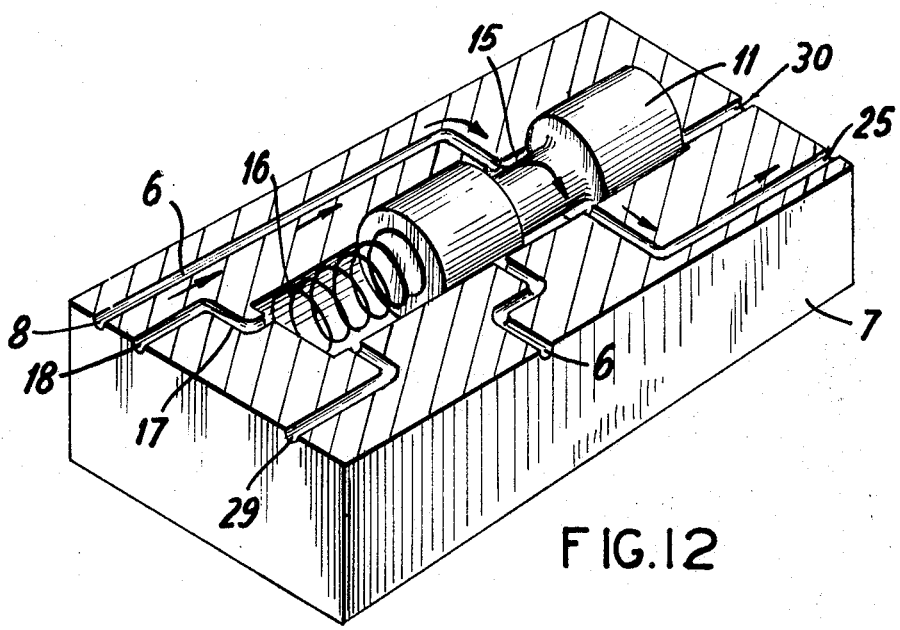
Figure 13:
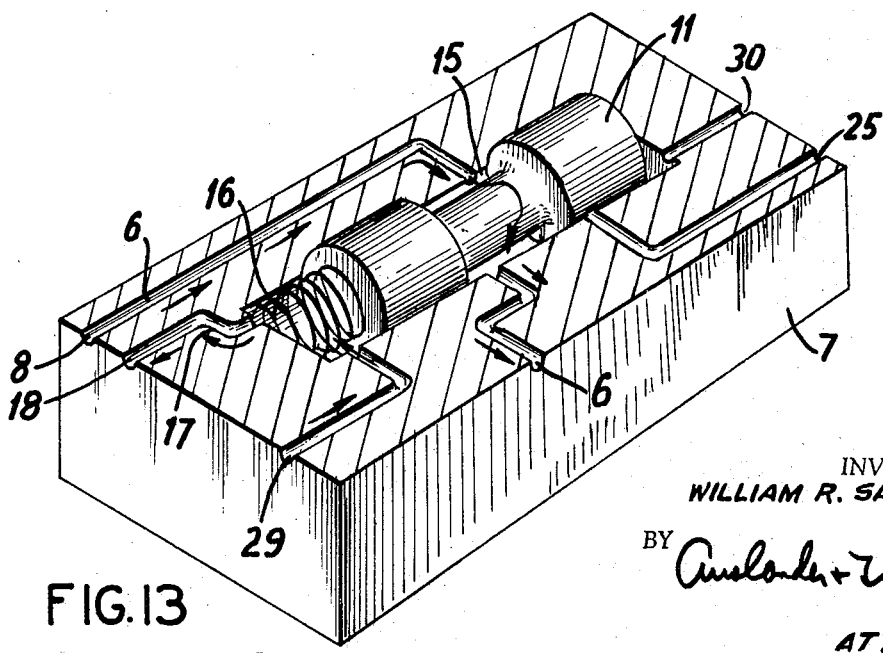
Figure 17:
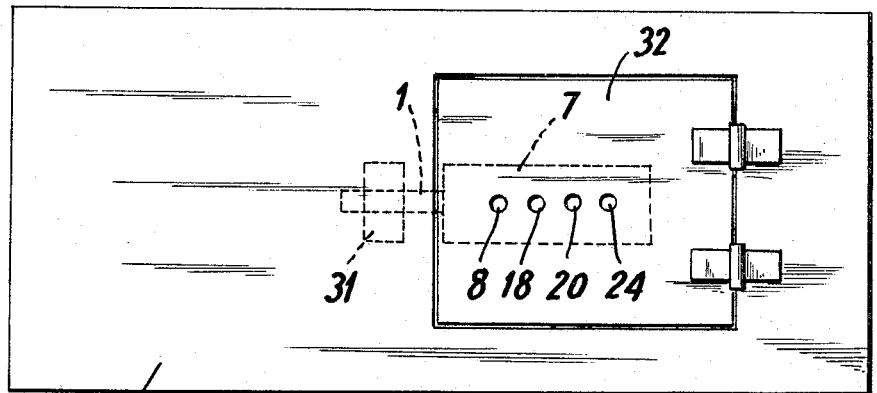
Figure 18:
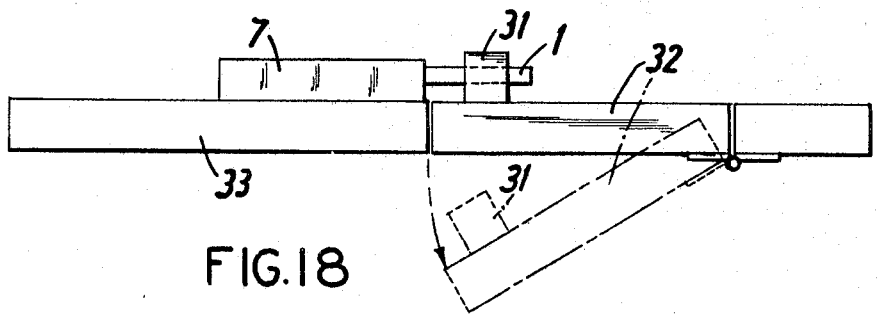
Figure 19:
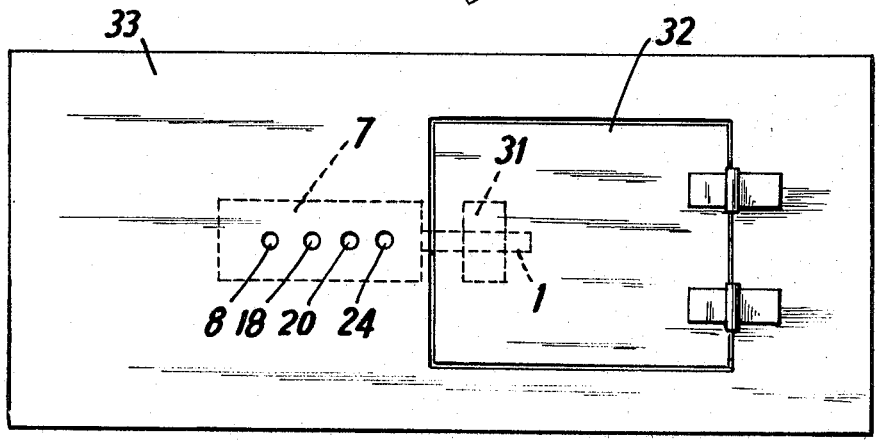
Figure 21:
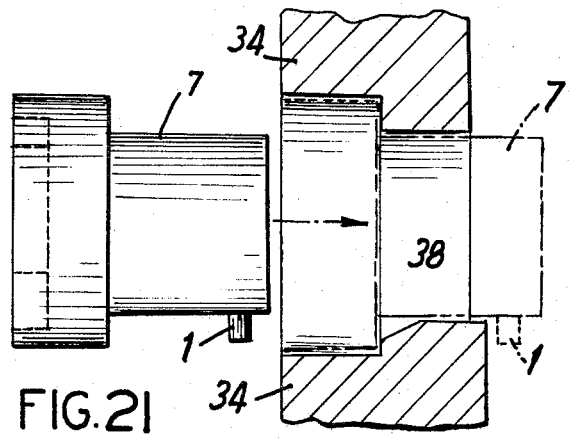
Figure 22:
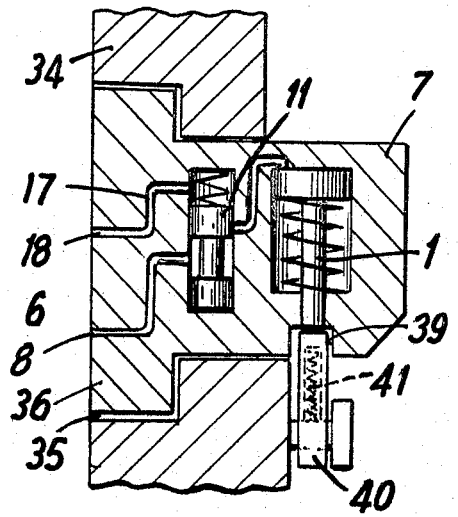
Figure 23:
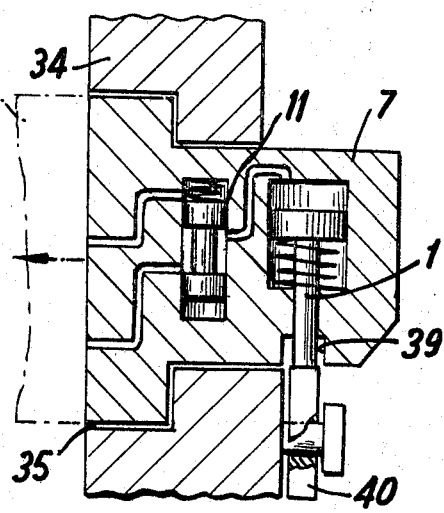
Figure 24:
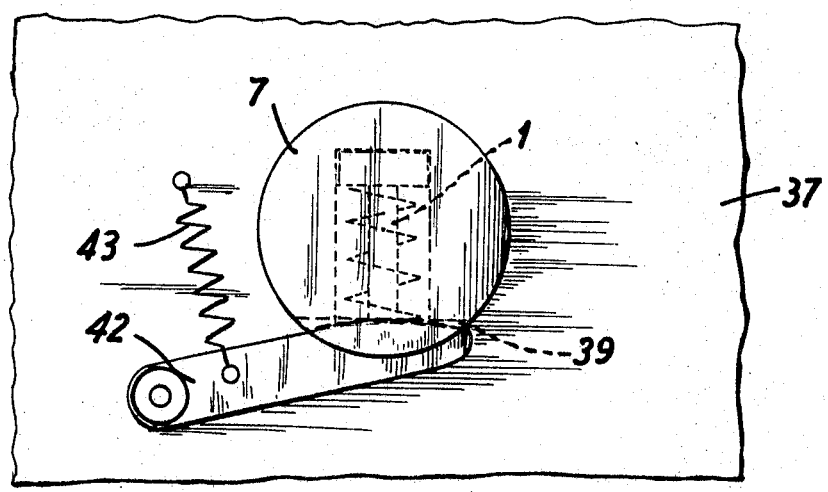
Figure 25:
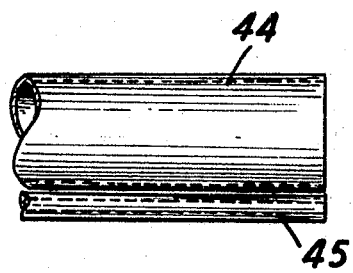
Figure 26:
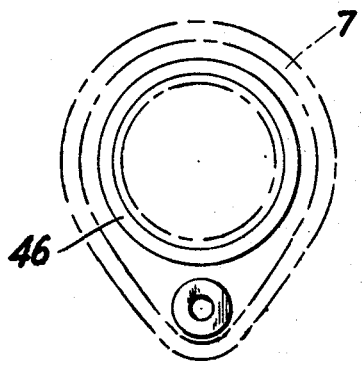
Figure 27:
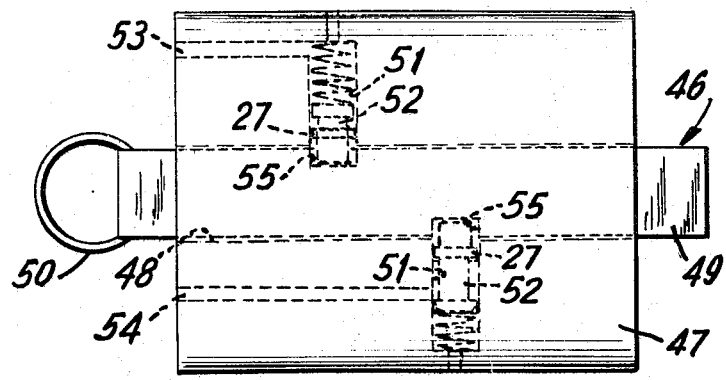
Figure 28:
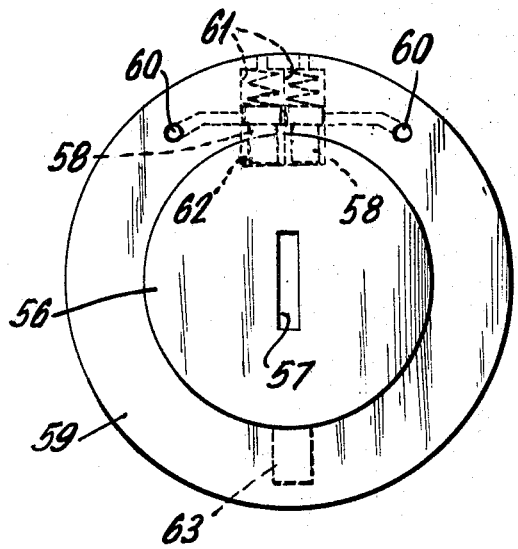
Figure 29:
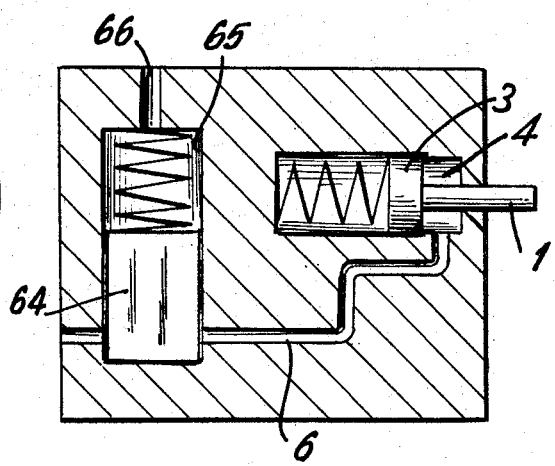
Figure 30:
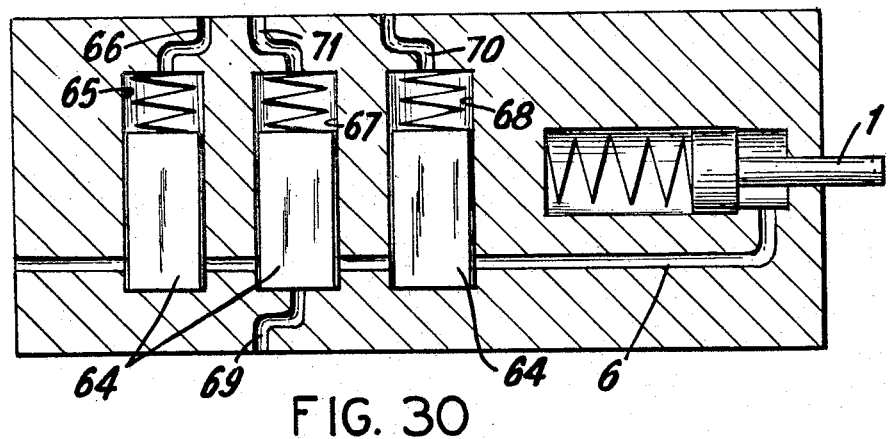
Figure 31:
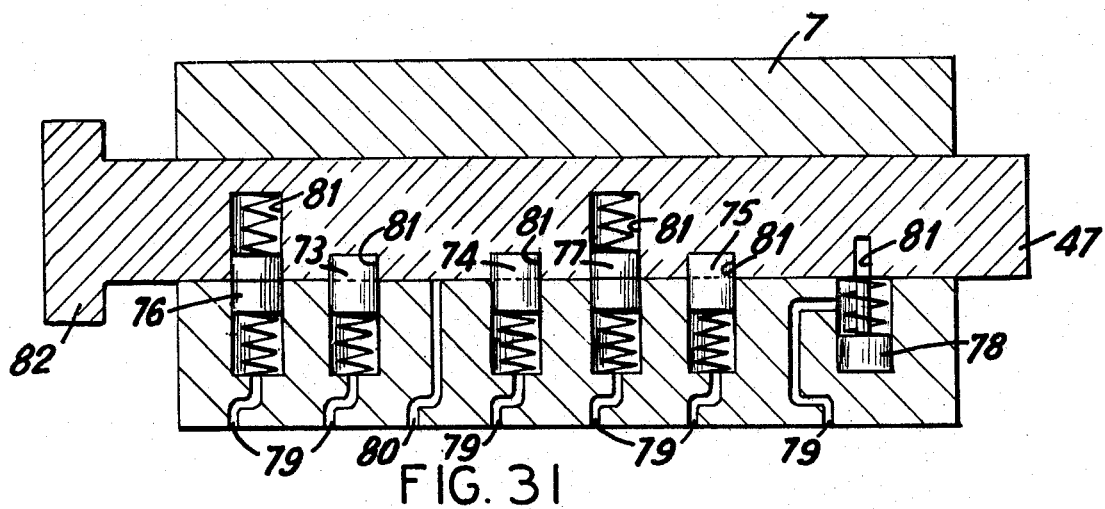
Figure 32:
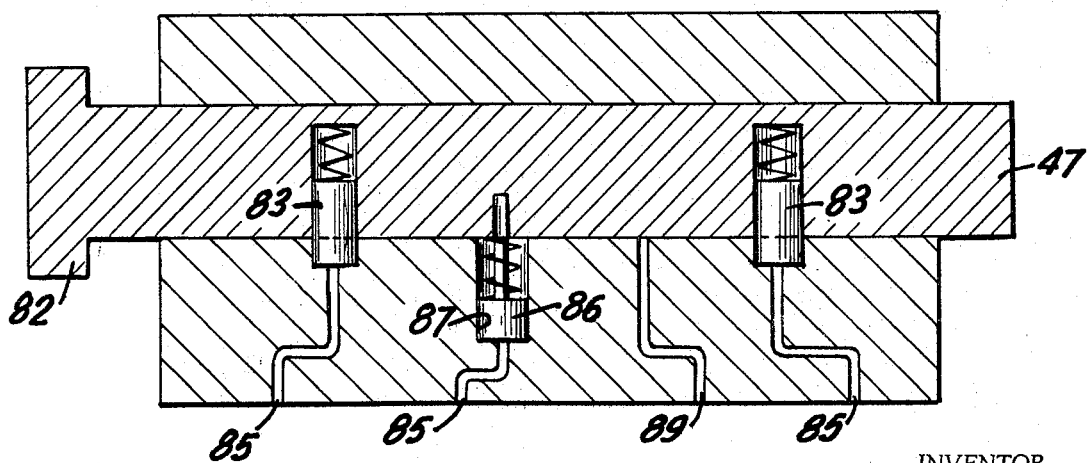

FIG. 1 is a cross sectional view of a lock device of the present invention.
FIG. 2 is a cross sectional view of another lock of the present invention.
FIG. 3 is a cross sectional view of another lock of the present invention.
FIG. 4 is a sectional view taken along lines 4—4 of FIG. 5.
FIG. 5 is an elevation view of a lock of the present invention.
FIG. 6 is a sectional view taken along lines 6—6 of FIG. 5.
FIG. 7 is a perspective view of a plunger of the present invention.
FIG. 7A is a front elevation of another plunger of the present invention.
FIG. 7B is a front elevation of another plunger of the present invention.
FIG. 8 is a perspective view of another plunger of the present invention.
FIG. 9 is a perspective view of another plunger of the present invention.
FIGS. 10 and 11 are perspective views of plungers employable with the present invention.
FIGS. 12 and 13 are sectional views, showing the plunger in perspective of a vacuum actuatable plunger of the present invention in neutral and active positions respectively.
FIG. 13A is a front elevation of a lock face of the present invention showing a plurality of access openings.
FIG. 14 is a front plan view of a lock of the present invention.
FIG. 15 is a sectional view taken along lines 15—15 of FIG. 14.
FIG. 16 is a top view of receptacle locking in accordance with the present invention.
FIG. 17 is a front view of the receptacle locking of FIG. 16.
FIG. 18 is a top view of another receptacle locking in accordance with the present invention.
FIG. 19 is a front view of the receptacle locking of FIG. 18.
FIG. 20 is a sectional view of a removable lock in accordance with the present invention.
FIG. 21 is an exploded sectional view of the lock of FIG. 20.
FIG. 22 is a sectional view of another removable lock of the present invention.
FIG. 23 is a sectional view of the lock of FIG. 22 as actuated for removal.
FIG. 24 is a side elevation of another removeable lock of the present invention.
FIG. 25 is a side elevation of a delivery conduit employable to release a lock of the present invention.
FIG. 26 is a front elevation of another lock of the present invention.
FIG. 27 is a side elevation of another embodiment of the present invention.
FIG. 28 is a front elevation of another embodiment of the present invention.
FIG. 29 is a cross sectional view of another embodiment of the present invention.
FIG. 30 is a cross sectional view of a further embodiment of the present invention.
FIG. 31 is a cross sectional view of a further embodiment of the present invention.
FIG. 32 is a cross sectional view of a further embodiment of the present invention.

Referring now to the figures in greater detail, where like reference numbers denote like parts in the various figures.

As shown in FIG. 1, a plunger latch 1 having an enlarged base portion 3 is seated within a chamber 4, the chamber 4 having an opening 5 at one end thereof so as to allow the narrow portion of the plunger latch 1 to exit therefrom. A spring 2 biases the plunger latch 1. As shown in FIGS. 1 and 2, the spring 2 is positioned to bias the plunger latch 1 within the chamber 4. The spring 2 may, as shown in FIGS. 3 and 4 be positioned to bias the plunger latch 1 outward of the opening 5 in the chamber 4. As will be more fully explained with respect to various of the locking configurations, the maintaining of a receptacle in closed position may be effected by either a maintaining of the plunger latch 1 in extended position, or by maintaining the plunger latch 1 in retracted position retaining a keeper to maintain the lock of the present invention engaged. The biasing effected by the spring 2 is determined by the nature of the locking configuration.

A passage 6 extends from the chamber 4 through the housing 7 which contains the plunger latch 1 to an exit point designated as 8 in FIG. 1 on the housing 7. If, as shown in FIG. 1, a vacuum were to be placed at point 8, the vacuum routed through the separate path or passage 6 would actuate the plunger latch 1 to extended position.

As shown in FIG. 1 a bleeder passage 9 extending from the chamber 4 exiting on the periphery of the housing 7 may be employed. The bleeder 9 allows leakage into the chamber 4 thus requiring a strong vacuum than would be required without the bleeder 9 to actuate the plunger latch 1.

However, the vacuum cannot freely reach the chamber 4 as described. Interposed in the passage 6 between the exit point or access 8 and the chamber 4 is a chamber 10, having therein a plunger 11. Plunger 11 may be of any desired configuration but in the embodiment herein described, is preferably cylindrical in shape having a central longitudinal portion of a smaller diameter than its end portions, the end portions having a diameter substantially equal to the diameter of the chamber 10. As shown in FIG. 1 a spring 12 biases the plunger 11 so that one of the wider diameter end portions of the plunger 11 blocks the passage 6. A passage 13 extending from the chamber 10 as a point juxtaposed to the end portion of the plunger 11 is routed so as to exit at an access point 14 along the outer periphery of the housing 7. In order to clear the passage 6 so that a vacuum presented at exit point 8 will reach the plunger chamber 4, the plunger 11 must be actuated, such as by the inflow of air pressure at access point 14 into the chamber 10 to force the plunger 11 into the chamber 10 and align the narrower diameter portion of plunger 11 between the entrance and exit points of passage 6 into the chamber 10. If actuation of the plunger 1 is desired, a user must be aware of the direction of air flow, i.e, a vacuum in passage 6 and an inflow in passage 13 and the same must be applied substantially simultaneously. While not a preferred embodiment resettable unbiased plungers may be used.

As shown in FIG. 2, the plunger 1 may itself be made actuatable by air inflow through passage 6 by having passage 6 exit at a point in plunger chamber 4 behind the base portion 3 of the plunger 1, and an additional plunger 11 and chamber 15 may be employed along the passage 6. In FIG. 2 a chamber 10 and plunger 11 such as described with respect to FIG. 1 are provided along the passage 6. A second chamber 15 is also serially aligned along passage 6, the chamber 15 having a plunger 11 therein spring biased by spring 16 so as to seal off passage 6 by one of the end portions of the plunger 11 being in juxtaposition with the access exit point of the passage 6 out of plunger chamber 15 towards the plunger latch 1. The plunger 11 in chamber 15, as shown in FIG. 2 is vacuum actuatable through a passage 17 which extends from the chamber 15 at a point below the plunger 11, the passage 17 exiting at an access point 18 on the housing 7.

In such configuration, in order to actuate the plunger 1 an air inflow must be presented at points 8 and 14 and a vacuum at point 18 or the passage 6 will not be clear to have the plungers cooperate to release locking engagement. The correct selection of gas action to the correct access means must be applied.

As shown in FIG. 3, if desired a third chamber having a passage 21 exiting at access point 20 on the housing 7, may be positioned along the passage 6 and the plunger 1 may be in locked position when extended and vacuum actuatable. An unauthorized person attempting to release a lock by withdrawing the plunger 1 would have to simultaneously place a vacuum at points 8 and 18 and an air inflow at points 14 and 20. Such party would then be faced with having to choose the proper combination of any type of air current flows and the separate routed paths to which they were applicable before he could actuate the latch plunger 1.

As shown in FIG. 4, a further chamber 22 may be provided having a plunger 11 which in normal position is maintained by springs 23 so as to keep passage 6 open, with such chamber 22 also having a passage 24 routed so as to exit at a point on the housing 7. If, an unauthorized person were to introduce either a vacuum or air inflow through passage 24, such plunger 11 in the chamber 22 would be actuated to block passage 6 and prevent the plunger latch 1 from being actuated.

So as to prevent a sufficient passage of air either by air inflow or vacuum from being forced through passage 6 from point 8 either due to air leakage about the plungers 11 or due to the fact that the air through passage 6 may otherwise actuate the plungers 11, air by-passes 25 such as shown in FIGS. 4–6 may be provided in each of the plunger 11 chambers. As shown in FIG. 4, each air by-pass 25 is located within the chambers 15, 19 and 22 at points which are open when the narrow diameter portions of the plungers 11 are in non-aligned position to the passage 6 so that upon proper actuation of the plungers 11 the by-passes 25 will be sealed off by the wider diameter end portion or portions of the plungers 11.

While the plunger 11 is preferably cylindrical as most clearly shown in FIG. 7, other configurations such as a solid rectangular configuration, such as shown in FIG. 7B spheres, or the like are readily employable and as shown in FIG. 7A, in lieu of the narrow diameter central portion on the plunger 11, a slot 11A may be employed. So as to eliminate air leakage, the wider diameter portions of the plungers 11 may be more closely fitted to the inner dimensions of its chamber by the provision of gaskets or sealing means such as O-rings 26 shown in FIG. 8 or U member 27 shown in FIG. 9.

In a like manner, the latch plunger 1 may be of any desired configuration such as cylindrical as shown in FIG. 10, with its wider base portion 3 more closely fitted to the inner dimensions of the plunger chamber 4 by an O-ring 28. If desired, the plunger 11 itself can be of a configuration such as shown in FIG. 10.

As shown in FIGS. 12 and 13 the outer portion of the housing 7 where only a single plunger 11 is employed presents an unauthorized user with 5 possible access openings to apply an air flow to, with only two of such openings being relevant to actuation. FIG. 12 illustrates the plunger 11 in its passage 6 blocking position and FIG. 13 in actuated position, the plunger 11 as shown actuatable by a vacuum. In addition to the passage 6 exit point 8 and passage 17 exit point 18, the housing 7 presents openings for the by-pass 25, a bleeder passage 29 and a relief passage 30. The relief passage 30 is desirable so that no vacuum will be presented within the plunger chambers to inhibit movement of the plungers. In lieu of such relief passage 30, the plungers may be of a slightly smaller diameter than the chambers so as to allow some air to pass thereby.

The bleeder path 29 allows an air inflow requiring a stronger vacuum to actuate the plunger 11. In air-inflow actuation embodiments, a bleeder passage is also a desireable feature since it allows the otherwise blocking pocket of air which may be present in the chamber to exit upon actuation of the plunger as a relief and also sets the requirement for the amount of air pressure needed for actuation.

Although size variation may be present insofar as the openings exiting on the housing 7 may be concerned and in actual use only one side of the housing 7 may be exposed, an unauthorized user is still presented with a plurality of access openings and a plurality of gas actuation requisites where but a single plunger 11 is employed.

If desired a lock face such as shown in FIG. 13A may be constructed having all passage openings 8, 18, 29, 25 and 30 facing outward, in which case the key combinations and permutations with which an authorized user are faced are vastly multiplied.

If it is desired that only relevent passage openings be presented on the outer face of the housing 7, a housing 7 such as shown in FIGS. 14 and 15 may be employed. As shown, the face of the housing 7 presents two openings, opening 8 for passage 6 and opening 18 for passage 17 leading to the vacuum actuatable plunger 11 in the chamber 15. The openings for the chamber 15, bleeder 29, relief 30, plunger chamber bleeder 9 and by-pass 25 exit on the sides of the housing 7.

As hereinbefore described, the lock may be kept from release when the plunger 1 is in extended position within or juxtaposed to a keeper 31 such as shown in FIGS. 16–21 or when the plunger 1 is in retracted position such as shown in FIGS. 22–24. As illustrated in FIGS. 16 and 17 the housing 7 may be mounted on the receptacle opening cover 32 with the plunger 1 in extended position within a keeper 31, maintaining the cover 32 in closed locked position. In FIGS. 18 and 19 the position of the keeper 31 and the housing 7 are reversed with the keeper 31 on the cover 32 and the housing 7 on the inner side of the wall 33 of the receptacle with the wall 33 having openings therethrough so that the passage openings 8, 18, 20 and 24 of the housing 7 are exposed therethrough.

FIGS. 20 and 21 illustrate a locking for a receptacle 34 wherein the housing 7 is removeable from an opening 35 in the receptacle 34 so as to allow access into the receptacle 34. As shown, the wall of the receptacle 34 is stepped so that the opening 35 is wider at its outwardly facing mouth. The housing 7 includes flanged end portion 36 which is of sufficient cross sectional dimensions to fit within the mouth of the opening 35 and abut the stepped portion of the opening 35. The body portion of the housing extends within the receptacle 34 beyond the thickness of the wall 37. The plunger 1 in extended position abuts the inner side of the receptacle wall 37 and the housing 7 is maintained within the opening 35 held by flange 36 and plunger latch 1. Upon actuation of the plunger latch 1, retracting the plunger 1 inward of the housing 7, the housing 7 may be removed from the opening 35.

To re-insert the housing 7, the housing 7 is positioned at the opening 35 and pushed inward of the opening 35. The plunger 1 during re-insertion may be maintained in retracted position by the air pressures as hereinbefore described, or, where the wall opening 35 includes a transverse bevel 38, the spring floating plunger 1 will retract as it rides up the slope of the bevel 38, and upon clearing the inner wall of the opening 35 assume its spring biased extended position.

As shown in FIGS. 22–24 the plunger 1 in retracted position may set the lock. Referring to FIGS. 22 and 23, the housing 7 may be set in an opening 35 in a receptacle 34, the opening 35 being stepped in the manner hereinbefore described with respect to FIGS. 20 and 21. The housing 7 includes an inset portion 39 with the plunger 1 adapted to be actuated to extension so as to fit within such insert portion 39. A spring biased pin 40 mounted on the inner side of the receptacle wall is biased upward by a spring 41 to fit within the inset 39. The pin 40 within the inset 39 in combination with the flanged portion 36 on the housing abutting the stepped portion of the opening 35 maintains the housing 7 within the opening 35.

To release the housing 7 the plunger 1 is actuated to extend, such as shown in FIG. 23. The plunger 1 moves the pin 40 out of the inset portion 39, with the main portion of the extended plunger 1 within the inset portion 39, and the housing 7 removed.

In FIG. 24, the housing 7 is constructed as described with respect to FIGS. 22 and 23 wherein a pawl 42 is biased by spring 43 within the inset portion 39, the plunger 1 when actuated pivoting the pawl 42 out of the inset portion 39.

While any suitable delivery system may be employed for the air flow to the housing 7 so that an authorized user may readily actuate the plunger 1, the delivery system may include hose configurations of varying dimensions or spacially pre-set to mate with the face of the housing 7. The configuration and arrangement of the gas flow configuration may act as a key. As in FIGS. 25 and 26 the vacuum conduit 44 and the air inflow conduit 45 are of varying diameters adapted to mate the face 46 of the housing 7.

While the plunger latch 1 has been shown aligned with the plunger or plungers 11 interposed along the interconnecting path of the plunger actuation means, it is within the scope of the present invention to have the plunger or plungers 11 set to otherwise free the other latches or other actuation means.

FIGS. 27 and 28 are illustrative of such arrangements.

In FIG. 27 there is shown a manually actuatable latch in the form of a bolt 46 slideably mounted within a channel 48 in a housing 47. The stop means for the bolt 46 are not shown. The end portion 49 of the bolt 46 when protruding outward of the housing 47 is readily adaptable to mate within a keeper (not shown) and act as a lock. The bolt 46 is moveable within the channel 48 with the end ring 50 serving as a grip for such actuation.

Plunger chambers 51 are disposed within the housing 47 juxtaposed to the channel 48 so that a plunger latch 52 will exit each of the chambers 51 portions in the channel 48. The plungers 52 are spring biased and gas actuatable as aforedescribed, such as by a vacuum being directed through the passage 53 or an air inflow directed through passage 54. The plungers 52 lock within notches suitably spaced on the latch 46 in normal position.

The plungers 52 may be of any desired shape so long as it is adaptable to move to latch and unlatch within the chambers 51.

As shown in FIG. 28 a cylinder locking device may be employed wherein the cylinder 56 must be rotatably actuated, before the release of the locking latch 63. The cylinder 56 is not actuatable unless the plungers 58, which are mounted in the cylinder housing 59 are retracted by air inflow actuation through passages 60, retracting the plungers 58 fully into chamber 61 and out of active engagement with the notches 62 provided on the periphery of the cylinder 56. After gas actuation the cylinder 56 may be rotated by turning the grippes 57.

As shown in FIGS. 29 and 30 where the plunger latch 1 is gas actuatable and plungers 64 are interposed along the passage 6, the plunger 64 may be of any desired configuration and the narrow diameter or slotted opening configurations such as shown in FIGS. 7, 7A, need not be employed. As shown in FIGS. 29 and 30 the plunger 64 is of a solid configuration such as shown in FIG. 7B with the plunger latch 1 actuatable by air inflow routed through passage 6.

In FIG. 29, the plunger 64 is spring biased within chamber 65 so as to intersect and block the passage 6 in normal position. The plunger 64 is vacuum actuatable through passage 66, retracting the plunger 64 from its intersecting position and allowing air inflow routed through the passage 6 to reach the chamber 4 to actuate the plunger 1.

As shown in FIG. 30, a series of plungers 64 may be disposed along the passage 6, such as plunger 64 within the chamber 65 and vacuum actuated through passage 66; plunger 64 within chamber 67 and air inflow actuatable through passage 69; and plunger 64 within chamber 68 vacuum actuatable through passage 70. A bleeder passage 71 may be employed with the air inflow plunger chamber 67.

As shown in FIG. 31 a bolt 47 is shown with plungers actuatable by vacuum alone. Stop means for holding the bolt 47 are not shown. The bolt 47 is held in the housing 7 by the plungers 73, 74, 75. Additional plungers 76, 77, 78 provide lock permutations and combinations requiring the proper applications of gas action in this case vacuum to the proper selected paths 79. A complete blind path 80 is further provided for additional security in keeping a stranger from knowing the proper selection of paths 79 to be actuated. The chambers 81 are both in the body 7 and the bolt 47. The key to the lock is the application of a vacuum to actuate the plunger latches 73, 74, 75 by retracting them. Pressure or vacuum on plunger 76 will engage it in locking engagement. The plunger is split so that it will not inhibit the opening of the bolt 47 when the correct actuation key has been applied. The plunger 77 is the same as plunger 76 and just adds permutation and combinations to the key combination. A vacuum applied to plunger 78 will engage the plunger in locking engagement if selected to have vacuum applied at its access point. The bolt once released from the latching engagement of the plungers 73, 74, 75 may be pulled by pulling the grippes 82 to release the bolt 47 from its keeper (not shown).

In FIG. 32 an all pressure selection embodiment of the present invention is shown with a bolt 47 in a housing 7. The plunger latches 83 must be forced into the chambers in the bolt 47 to release the bolt 47. Pressure must be applied at the selected paths 85 in order to effect a release. The plunger 86 in chamber 87 will serve as a latch if pressure is communicated through path 85. Path 89 is just a blind path.

As can be seen in order to effect a locking system requiring a key to open the system, the combination of at least two chambers and plungers, options as to the type of gas action to be applied and selection as to proper openings of the routes, paths for gas action provide options to select from, enabling the lock of the present invention to be a lock requiring more than just the application of pressure or vacuum to release a latch means.

As in all embodiments, the gas operated plungers or plunger latches must be actuated (or in the case of a neutral plunger already properly positioned, non-actuated) to permit the plunger latch or other latching mechanisms to release the locking system.

The terms and expressions which are employed are used as terms of description; it is recognized, though that various modifications are possible within the scope of the invention claimed.

I claim:

1. A gas action locking system including lock housing means, at least two chambers in said lock housing means, plunger means in at least two of said chambers, said plunger means adapted to be actuated within said chambers, at least one of said plunger means adapted to cooperate in latching engagement in said locking system, said plunger means adapted to be actuated by gas action, a plurality of paths separately routed, at least two of such paths each opening into at least one selected portion of at least one of said at least two chambers having plunger means therein, access means to said separate paths, at least two said access means adapted to communicate gas action through said paths to said at least two chambers having plunger means therein, and said plunger means in said at least two chambers adapted to release the plunger means adapted to cooperate in locking engagement when actuated by selected gas action at selected access means wherein said gas action includes a selected pressure and a selected vacuum applied at selected access means.

2. A gas action locking system including lock housing means, at least two chambers in said lock housing means, plunger means in at least two of said chambers, said plunger means adapted to be actuated within said chambers, at least one of said plunger means adapted to cooperate in latching engagement in said locking system, said plunger means adapted to be actuated by gas action, a plurality of paths separately routed, at least one of such paths opening into a selection portion of one of said chambers having plunger means therein, at least one other of said paths opening into a selected portion of a second of said chambers having plunger means therein, separate access means for the separate introduction of gas action to said separate paths, each of at least two of said access means adapted to communicate gas action through its respective path to its associated chamber having plunger means therein, at least one of said at least two chambers communicating with the access path to the other of said at least two chambers, and said plunger means in said at least two chambers adapted to functionally cooperate to release the plunger means adapted to cooperate in locking engagement when actuated by selected gas action at selected access means.

3. The invention as claimed in claim 2 wherein said gas action is a pressure.

4. The invention as claimed in claim 2 wherein said gas action is a vacuum.

5. The invention as claimed in claim 2 wherein said gas action includes a selected pressure and a selected vacuum applied at selected access means.

6. The invention of claim 2 including more than two chambers with plunger means actuatable within said chambers.

7. The invention of claim 2 including additional plunger means actuatable to cooperate in latching engagement in said locking system when actuated by gas action.

8. The invention of claim 2 wherein said plunger means are biased to return to normal position when not actuated.

9. The invention of claim 2 wherein at least one of said plunger means comprises more than one portion.

10. The invention of claim 8 wherein at least one of said plunger means comprises more than one portion.

11. The invention of claim 2 wherein at least one plunger means in unactuated position obstructs at least one of said paths.

12. The invention of claim 2 wherein said selected gas action is simultaneously applied at said selected access means.

13. The invention of claim 2 wherein at least one plunger means includes a portion unresponsive to gas action.

14. The invention of claim 2 wherein at least one plunger means includes by-pass means.

15. The invention of claim 2 wherein at least one of said plunger means includes an opening therethrough adapted to act as a by-pass.

16. The invention of claim 2 wherein at least one of said plunger means includes a portion adatped to extend outside its chamber.

17. The invention of claim 2 wherein at least one of said plunger means includes gasket means.

18. The invention of claim 17 wherein said gasket means are O rings.

19. The invention of claim 17 wherein said gasket means are U rings.

20. The invention of claim 2 including relief means in at least one of said chambers adapted to aid free movement of said plunger means upon gas actuation.

21. The invention of claim 2 including by-pass means in at least one of said chambers adapted to by-pass a non-actuating selection of gas action without releasing said means cooperating to maintain locking engagement.

22. The invention of claim 2 including bleeder means in at least one of said chambers adapted to control the degree of selected gas action to release said means cooperating to maintain locking engagement.

23. The invention of claim 2 including at least one dummy access means and its associated path.

24. The invention of claim 20 including an access means to said relief means included among said selected access means.

25. The invention of claim 21 including an access means to said relief means included among said selected by-pass means.

26. The invention of claim 22 including an access means to said relief means included among said selected bleeder means.

27. The invention of claim 2 including at least one additional plunger means actuatable to obstruct at least one path blocking release of said latching engagement when said additional plunger means is actuated by gas action.

References Cited
UNITED STATES PATENTS

| | | | |
|---|---|---|---|
| 722,258 | 3/1903 | Sines | 70—275 |
| 2,869,778 | 1/1959 | Share. | |
| 3,034,705 | 5/1962 | Share. | |

RICHARD E. MOORE, Primary Examiner

R. L. WOLFE, Assistant Examiner